May 21, 1935.  G. F. SPETTEL  2,001,802
COMBINATION DOORSTEP
Filed Nov. 19, 1934
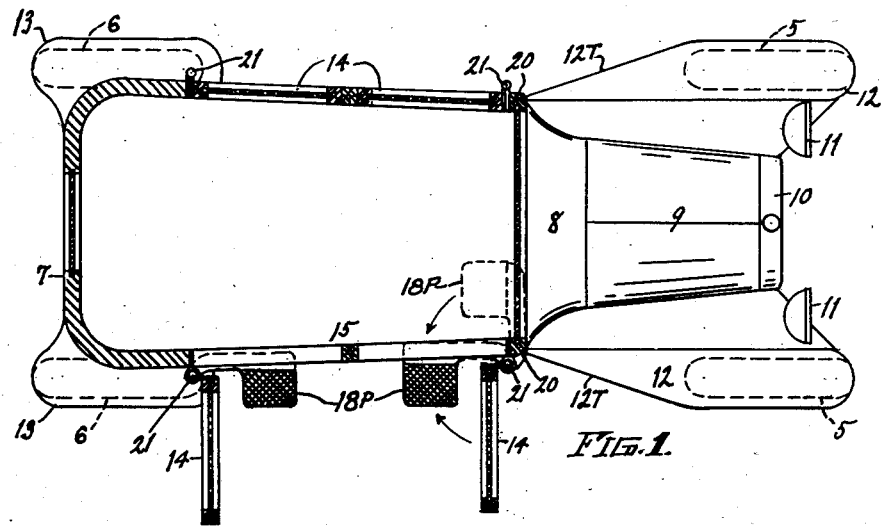
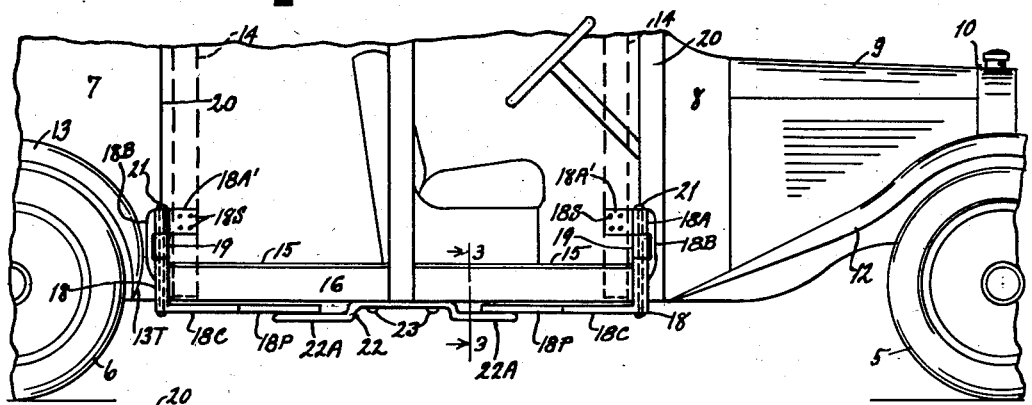
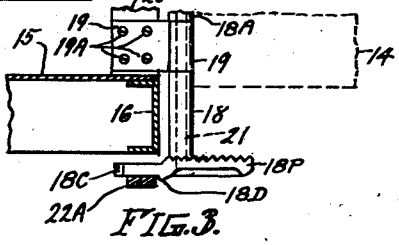
INVENTOR.
George F. Spettel
BY David E. Carlsen
ATTORNEY.

Patented May 21, 1935

2,001,802

UNITED STATES PATENT OFFICE 2,001,802

COMBINATION DOORSTEP

George F. Spettel, St. Paul, Minn.

Application November 19, 1934, Serial No. 753,690

5 Claims. (Cl. 280—166)

My invention relates to improvements in steps or treads adjacent to doors and is particularly adapted for use on motor vehicles. It comprises a disappearing step or tread operating in conjunction with the movements of a door, being brought into operative position when the door is opened to a predetermined position, for example when an automobile door is opened to discharge or take on passengers.

The main object of this invention is to provide a disappearing step of this kind and which is of highly efficient and yet extremely simple and inexpensive construction.

The device is applicable to other classes of vehicles and doors but embodies certain features in automobile construction in which so-called running boards are eliminated and the front and rear fenders are tapered toward the side of the car and away from the wheels. An object of the latter in conjunction with my step device is to design a motor-vehicle, or other vehicle equipped with my step device, without running board nor any protuberance enabling unauthorized persons to get on the vehicle after the doors are closed.

The above objects and further objects of my invention are attained by the novel combination and structure of parts hereinafter fully described, reference being had to the accompanying drawing, in which:—

Fig. 1 is a plan view of a passenger car of the so-called sedan type, the body of the car being shown in section and including an illustration of two of my step devices at one side of the car in operative position.

Fig. 2 is an enlarged right side elevation of the car shown in Fig. 1.

Fig. 3 is an enlarged sectional view as on line 3—3 in Fig. 2 revealing more fully certain details of my improved car step.

Referring to the drawing by reference numerals, like parts in the various views being designated by corresponding numbers, I have illustrated my device as applied to a so-called four-door, or sedan type of motor vehicle in which 5 are the front wheels, 6 the rear wheels, 7 the body, 8 the cowl, 9 the hood, 10 the radiator, 11 the headlights, 12 the front fenders, 13 the rear fenders and 14 the doors of which latter there are two at each side. 15 is the car floor laid on the frame members 16.

The disappearing step is of extremely simple construction involving, in a preferred form, an upright elongated tubular hinge member of two spaced and connected parts of which the lower part is designated 18, the upper part 18A, both connected rigidly and integrally by a part 18B. The upper hinge part has an integral flat plate 18A' which is screwed as at 18S to the inner edge part of a door 14. 19 is a hinge member fixed as at 19A to an upright door frame member or post 20 and its hinge part retained pivotally between the upper and lower hinge parts 18—18A by a common hinge pin 21.

From the lower end of hinge member 18 extends horizontally an integral arm 18C at the outer end of which is formed an integral flat step-plate 18P. Said plate and its arm are so located with relation to the hinge means that when the door is closed the step-plate 18P is located under the floor of the car (see dotted line position of the forward right hand step-plate in Fig. 1).

When the door is opened the step-plate swings outwardly and is exposed centrally of and below the door opening. Both of the right hand doors of a car are shown open in Fig. 1 and their step-plates in position for persons to tread on in entering or leaving the car.

To prevent accidental movement of a door and its step-plate while the door is supposed to remain open I provide a guide bracket 22 fixed at 23 longitudinally under the car frame said bracket having a downward offset part 22A so positioned that when the step-plate moves outwardly it rides lightly on the upper face of said arm 22A. On the under side of the step-plate or its arm I provide a small rounded projection or shoulder 18D (see Fig. 3) so positioned that it will contact the outer edge of arm 22A when the step is moved to its outer position and frictionally engages said arm additionally when there is weight on the step-plate, thus preventing the plate from moving and also the door. However as this contact is only light when there is no weight on the plate the projection rides yieldably over the arm 22A when the door is swung in or out.

Obviously this device is adaptable for so-called coaches also and in which there is only one door at each side of the car body. Proportions of the various parts described are of course subject to change according to proportions of the car, car-doors, etc., etc. In some cases it may be desirable to have the step-plate at such height that the arms 18C must be offset downwardly and the guides 22A correspondingly offset.

The construction above set forth provides for a relatively smooth and unbroken side construction for a car, eliminating so-called running boards and the drop panel extending down thereto from the car frame.

Therefore I provide front and rear fenders, tapering respectively as 12T to a point on the car just forward of the front door approximately at the front corners of the car body, and to the side of the car adjacent the rear door as at 13T in Fig. 2.

Thus I have provided in combination a disappearing car step and a car body and fender design in which there is no foot-hold when the doors are closed and the car in motion. This not only simplifies car construction, reducing manufacturing costs, etc., but absolutely prevents entering or mounting a car while the doors are closed. Aside from the utility of my novel car step the above feature is highly desirable for obvious reasons and as previously stated herein.

I claim:

1. In combination, a vehicle having wheel fenders tapered toward the vehicle body to points in proximity to the hinged side of the doors of said vehicle, a hinge member at the lower part of each door comprising in part an integral horizontally extending arm directed toward and under the car body when the door is closed, a step-plate formed integral with the outer end of said arm and exposed laterally of and in horizontal plane outwardly of the door opening when said door is in predetermined open position.

2. The structure specified in claim 1, and means for yieldably retaining a step-plate in the latter operative position.

3. The structure specified in claim 1, and means for yieldably retaining a step-plate in the latter operative position, said means consisting in forming the step-plate at its under side with a downward projection, a guide bracket fixed to the vehicle and having an arm extension on which said step-plate contacts and is guided during closing and opening movement of the door, said projection located to engage said bracket arm when the step-plate is in operative position and the door open.

4. A disappearing door step device for doors of the class described, said device comprising a lower door hinge member, an arm integral with said hinge and extending radially therefrom, a step-plate formed integral with said arm in horizontal plane and exposed outwardly of and below the door opening when the door is open and retracted under the door opening by the closing of the door.

5. The structure specified in claim 4, and means for guiding said step-plate member while swinging in horizontal plane to operative position, and means on said arm and step-plate for yieldably engaging the guide means for the purpose set forth.

GEORGE F. SPETTEL.